Patented Aug. 23, 1949

2,479,983

UNITED STATES PATENT OFFICE 2,479,983

STORAGE BATTERY EXPANDER MATERIAL AND PROCESS FOR PREPARING THE SAME

Alexander Stewart, Mountain Lakes, N. J., and Adrian R. Pitrot, Hempstead, and Eugene Willihnganz, Baldwin, N. Y., assignors to National Lead Company, New York, N. Y., a corporation of New Jersey No Drawing. Application June 15, 1943, Serial No. 490,934

4 Claims. (Cl. 136—27)

This invention relates to the preparation of an improved organic, storage-battery material or expander. More specifically, it relates to the preparation of such an improved organic material from waste sulphite liquor.

When raw sulphite liquor is concentrated or dried and then used in a small amount in the negative paste together with the usual lead oxide mixture, it is found that when the battery is given its first charge the efficiency of rapid conversion of the litharge to sponge lead in the negative plate is impaired. The electrolyte tends to foam and plates will be found to contain a considerable amount of unformed lead sulphate at the end of a normal forming process. These characteristics are frequently spoken of as "foaming" and "sulfation."

In a previous patent (U. S. Patent No. 2,022,482) of Alexander Stewart, one of the inventors herein, a process was described whereby a useful active mateiral for negative plates was obtained by treating raw waste sulphite liquor. The treatment described in said patent served to remove a considerable proportion of the foam-producing materials in the waste liquor. However, the more complete separation of undesirable constituents further to improve battery performance and further to eliminate detrimental foam-producing materials has presented a problem heretofore unsolved.

According to the present invention, it has now been found that an improved active material for storage battery plates, substantially completely free of undesirable foam-producing and sulfating agents, can be prepared by treating waste sulfite liquor with a mineral acid under controlled conditions of temperature and acid concentration. In carrying out the present invention, waste sulfite liquor is treated with a dilute mineral acid, preferably sulfuric acid, in such wise that the concentration of the acid employed varies inversely with the temperature. Particularly good results have been obtained by using a dilute mineral acid, the concentration of which ranges from about 0.5% to about 20% by weight, at temperatures between about 185° C. and 85° C.

When waste sulfite liquor is treated with a dilute mineral acid as described in U. S. Patent No. 2,022,482, previously mentioned above, it is believed that a material is obtained which represents the lignin molecule combined with sulfur dioxide and which probably also contains a small amount of undesirable carbohydrate content. By controlling the factors of temperature and acid concentration in the treatment of waste sulphite liquors according to the present invention, it is believed that the lignin molecule polymerizes and the resultant material, while retaining its activity, becomes less soluble in dilute sulfuric acid and loses all tendency to foam and retard the so-called forming process. Furthermore, the activity of the polymerized lignin molecule is increased and intensified either because of the separation by filtration of certain undesirable carbohydrate constituents after the hydrolysis caused by the treatment herein described or because of the fact that such undesirable carbohydrate constituents are rendered inert and harmless by the process of the present invention.

Regardless of the exact nature of the changes that are accomplished in the organic product, it is definitely known that by the practice of the present invention it is possible to obtain an active organic material or expander for storage battery plates that is from 20% to 65% more active, as measured by the usual S. A. E. cold life test, than prior art expanders.

In order that the active organic material of the present invention may be more readily identified, it may be stated that such material is quite similar to the original sulfite liquor material but differs therefrom in so far as it is substantially insoluble in dilute sulfuric acid or storage battery electrolyte. This acid-insoluble product, when used in the negative plates of storage batteries, effects a marked improvement in the performance and capacity discharge of storage batteries, particularly at low temperature operations.

The waste sulphite liquor raw material may be used in any of the various forms in which it is commercially available. Such liquor is often marketed as a concentrated sirup and also as a desiccated powder. These prepared products are generally formed by treating the original dilute liquor with caustic lime followed by concentration, and, in the case of the dry product, spray drying. The slightly higher alkali metal content of the concentrated or dried product is without effect in the practice of this invention and all forms of waste sulphite liquor, may be used with equal benefit. It is to be preferred, however, for convenience to use dry waste sulfite liquor material and the commercially available dried product will be suitable.

For the purpose of illustrating the precise manner of carrying out the present invention, the following examples are given wherein the parts are by weight:

Example I

One part of dry sulphite liquor material was dissolved in 1.5 parts of water and 0.068 part of sulphuric acid of a specific gravity of 1.84. This solution was stirred and then evaporated to dryness in an open vessel at a temperature of about 85° C. The product was then brought to constant weight, that is, all the volatile constituents were driven off, at a temperature of 100° C. This dry material was then taken up with ten times its weight of cold water and stirred for about 1½ hours. A gelatinous material resulted which was washed with water and dried. The dry precipitate was ground to pass through a 100 mesh screen. This material was then incorporated into the negative plate in the usual manner, in an amount between about 0.1% and 5% by weight.

Instead of evaporating the solution of sulfite liquor material to dryness, the said solution may, after the prescribed heat treatment, be filtered as shown in the following examples:

Example II

One part of dry sulphite liquor material and 10 parts of water were stirred until solution was complete. About 2 parts of sulphuric acid of a specific gravity of 1.84 were added. The solution was then heated and constantly stirred in a suitable vessel until the temperature reached about 85° C. The solution was then filtered while still hot and the precipitate washed with a small volume of sulphuric acid of specific gravity 1.150 and stirred into ten times its weight of water. To this solution, about ten parts of litharge were added under stirring until the solution became alkaline. The solution was then filtered and the solid material dried at a temperature of about 100° C. After being ground, this material was then incorporated into the negative plate in the usual manner and in such proportions that the negative plate contained from about 0.1% to about 5% by weight of the organic expander of the present invention.

Example III

One part of dry sulphite liquor material, 6 parts of water and 0.13 part of sulphuric acid of a specific gravity of 1.84 were stirred until solution of the sulfite liquor material was complete. The solution was then placed in a closed vessel and heated until the temperature reached about 170° C. This corresponded to a gauge pressure of approximately 100 pounds per square inch. This temperature was held for one hour after which the solution was cooled, filtered and the precipitate washed with cold water. The precipitate was then added to 10 parts of water after which 2 parts of litharge were added and stirred in until the solution became alkaline. It was then filtered and the solid material dried at a temperature of approximately 100° C. After grinding, this material was incorporated in the negative plate of a battery in the usual manner and in such proportions that the negative plate contained from about 0.1% to about 5% by weight of the organic expander prepared as aforesaid.

Example IV

One part of dry sulphite liquor material, 4 parts of water and 0.045 part of sulphuric acid of specific gravity of 1.84 were stirred until solution of the sulfite liquor material was complete. The solution was then placed in a closed vessel and heated to a temperature of about 170° C., which corresponded to a gauge pressure of approximately 100 pounds per square inch. This temperature was held for about one hour after which the solution was cooled. Two parts of litharge were then added to the solution which was stirred until alkaline. The solution was then filtered and the solid material dried at a temperature of about 100° C. After being ground the product was incorporated in the negative plate of a storage battery in the usual manner and in such proportions that the organic content of the plate was between about 0.1% and about 5% by weight.

It will be understood that the above examples are presented merely for purposes of illustration and it is to be appreciated that variations may be practised by those skilled in the art without departing from the spirit of the present invention. For instance, in the place of waste sulphite liquor it is possible to start with secondary products derived from waste sulphuric liquor, or with a pure lignin prepared by methods well known in the art. Such products may then be converted to soluble forms and treated according to the present invention.

It is to be understood that the usual additions of barium sulphate and lampblack may be made to the active material containing the improved organic material of the present invention. It is further possible to use the acid solution resulting from the treatment at elevated temperatures directly instead of subsequently neutralizing and drying the product as illustrated in the examples. In such event, the acid solution may be properly adjusted to the strength of acid commonly used for making pastes.

As previously explained, the concentration of acid used in the present process varies inversely with the temperatures employed and ranges from a weak acid with a strength of about 0.5 to 1.0% at temperatures around 170° C.–185° C., to a stronger acid, i. e., up to about 18 to 20% strength at temperatures around 85° C.–100° C.

Having thus described our invention, we claim the following as new and useful:

1. The process of making an active organic battery paste ingredient which comprises precipitating organic material from waste sulfite liquor by adding thereto a low concentration mineral acid and heating the mixture, the temperature-concentration relation being within the range—0.5% (by weight) concentration of acid used at 185° C. to 20% (by weight) concentration of acid at 85° C., and separating and washing the precipitate.

2. The process of manufacturing an improved active organic storage battery plate ingredient which comprises polymerizing the lignin-containing product of waste sulfite liquor with a dilute sulfuric acid of concentration between 15% and 0.5% at temperatures between about 80° C. and about 185° C. filtering off the precipitate and washing the same.

3. The process of manufacturing an improved active organic storage battery plate ingredient which comprises treating at temperatures between about 85° C. and about 185° C. a waste sulfite liquor with dilute sulfuric acid of a concentration between about 20% and about 0.5% by weight until a precipitate of active organic material is obtained, filtering off said precipitate and washing the same.

4. An improved active organic storage battery plate ingredient comprising a product obtained according to the process of claim 1, said active organic material being substantially insoluble in dilute mineral acid.

ALEXANDER STEWART.
ADRIAN R. PITROT.
EUGENE WILLIHNGANZ.

REFERENCES CITED

The following references are of record in the file of this patent:

UNITED STATES PATENTS

| Number | Name | Date |
|---|---|---|
| 1,147,245 | Hurt | July 20, 1915 |
| 1,731,354 | Schwalbe | Oct. 15, 1929 |
| 2,022,482 | Stewart | Nov. 26, 1935 |
| 2,079,207 | Hibbert et al. | May 4, 1937 |
| 2,365,600 | Schorger | Dec. 19, 1944 |
| 2,371,137 | Orsino | Mar. 13, 1945 |